United States Patent
Knauer

(10) Patent No.: US 10,629,074 B2
(45) Date of Patent: Apr. 21, 2020

(54) FAST LANE DRIVING WARNING UNIT AND METHOD

(71) Applicant: Robert Bosch GmbH, Stuttgart (DE)

(72) Inventor: Thomas Knauer, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/305,975

(22) PCT Filed: May 24, 2017

(86) PCT No.: PCT/EP2017/062606
§ 371 (c)(1),
(2) Date: Nov. 30, 2018

(87) PCT Pub. No.: WO2017/207398
PCT Pub. Date: Dec. 7, 2017

(65) Prior Publication Data
US 2019/0304302 A1    Oct. 3, 2019

(30) Foreign Application Priority Data

May 31, 2016    (CN) .......................... 2016 1 0373946

(51) Int. Cl.
*G08G 1/0967*    (2006.01)
*G06T 7/70*    (2017.01)
(Continued)

(52) U.S. Cl.
CPC ....... *G08G 1/0967* (2013.01); *G06K 9/00798* (2013.01); *G06K 9/00818* (2013.01);
(Continued)

(58) Field of Classification Search
CPC .... G08G 1/0962; G08G 1/0133; G08G 1/052; G08G 1/0967; G06T 7/70; G06K 9/00798; G06K 9/00818
(Continued)

(56) References Cited

U.S. PATENT DOCUMENTS 9,842,496 B1 * 12/2017 Hayward ............... G01C 21/34
2005/0232469 A1 * 10/2005 Schofield ........... G06K 9/00818
382/104
(Continued)

FOREIGN PATENT DOCUMENTS

CN    203552470    4/2014

OTHER PUBLICATIONS

International Search Report for Application No. PCT/EP2017/062606 dated Sep. 8, 2017 (3 pages).

*Primary Examiner* — Hung T Nguyen
(74) *Attorney, Agent, or Firm* — Michael Best & Friedrich LLP

(57) ABSTRACT

A fast lane driving warning unit and a method are disclosed, in which images in front of a vehicle (6) which runs on a road that comprises a fast lane (L1) are continuously captured, the images to determine whether the vehicle (6) is driving in the fast lane (L1) are analyzed; and a warning signal is sent out when the following conditions are both met: the vehicle (6) runs in the fast lane (L1) at a vehicle speed lower than a lower limit of an allowed speed range of the fast lane (L1) over time longer than a preset time period; and the current traffic condition of the fast lane (L1) permits the vehicle (6) to run in the allowed speed range of the fast lane (L1).

16 Claims, 2 Drawing Sheets

(51) Int. Cl.
*G06K 9/00* (2006.01)
*G08G 1/01* (2006.01)
*G08G 1/052* (2006.01)
*G08G 1/16* (2006.01)
*G08G 1/0962* (2006.01)

(52) U.S. Cl.
CPC ............ *G06T 7/70* (2017.01); *G08G 1/0133* (2013.01); *G08G 1/052* (2013.01); *G08G 1/09623* (2013.01); *G08G 1/167* (2013.01); *G06T 2207/30236* (2013.01); *G06T 2207/30256* (2013.01)

(58) Field of Classification Search
USPC ............... 340/435, 436, 441, 466, 903, 905; 382/103, 113; 348/148; 701/408, 428
See application file for complete search history.

(56) References Cited

U.S. PATENT DOCUMENTS

| | | | |
|---|---|---|---|
| 2006/0061461 A1* | 3/2006 | Li | G06K 9/3258 340/441 |
| 2009/0195411 A1* | 8/2009 | Ichihashi | G08G 1/096716 340/905 |
| 2010/0007523 A1 | 1/2010 | Hatav | |
| 2010/0121526 A1* | 5/2010 | Pham | B60W 30/146 701/36 |
| 2013/0251209 A1 | 9/2013 | Kim | |
| 2015/0025800 A1 | 1/2015 | An | |
| 2015/0356869 A1 | 12/2015 | Young | |

\* cited by examiner

FAST LANE DRIVING WARNING UNIT AND METHOD

BACKGROUND OF THE INVENTION

The disclosure relates to a unit and method for warning a driver who drives a vehicle in a fast lane at low speed over a long time.

Many roads, especially high speed roads, have two or more lanes in a driving direction, among which there is a fast lane in which vehicles are allowed to run at high speed. For example, in countries with right-hand traffic, the left most lane of the road lanes in the same direction is the fast lane. Some fast lanes are also called as overtaking lanes in which vehicles are allowed to run when their speeds reach a certain required level. There are generally allowed speed ranges for the lanes of a road, and the allowed speed range for a fast lane is higher than other lanes. When a vehicle runs in a fast lane, it is not allowed to run at a speed higher than the higher speed limit or lower than the lower speed limit of the allowed speed range. If the vehicle runs in a fast lane at a speed that is lower than the lower speed limit of the allowed speed range for a long time without reasons, the vehicle will hinder other vehicles behind it, and those vehicles have to overtake it from right side, which breaks the left side overtake regulation and may result in traffic accidents.

For vehicles running in a fast lane at low speed over a long time, not all the drivers drive the vehicles in this way intentionally. Some drivers just do not realize that they are driving the vehicle too slow. Thus, it is advantageous to warn them in this condition.

SUMMARY OF THE INVENTION

An object of the disclosure is to provide warning a driver who drives a vehicle in a fast lane at low speed over a long time.

According to one aspect of the disclosure, there provides a fast lane driving warning unit which comprises a processing unit, and a camera and a warning element connected with the processing unit respectively; wherein the camera is configured to continuously capture images in front of a vehicle which runs on a road that comprises a fast lane; wherein the processing unit is configured to receive images captured by the camera and analyzes the images to determine whether the vehicle is driving in the fast lane; and wherein the processing unit is further configured to instruct the warning element to send out a warning signal when the following conditions are both met: the vehicle runs in the fast lane at a vehicle speed lower than a lower limit of an allowed speed range of the fast lane over time longer than a preset time period; and the current traffic condition of the fast lane permits the vehicle to run in the allowed speed range of the fast lane.

According to a possible embodiment, the processing unit is configured to determine the lane in which the vehicle is driving based on the right and left lane boundary lines delimiting the lane.

According to a possible embodiment, the preset time period is 1 to 5 minutes, and the preset time period is adjustable.

According to a possible embodiment, the processing unit is configured to obtain the allowed speed range of the fast lane from images of traffic signs of the road captured by the camera and/or from a navigation system of the vehicle.

According to a possible embodiment, the processing unit is configured to determine whether the current traffic condition of the fast lane permits the vehicle to run in the allowed speed range of the fast lane based on the images captured by the camera.

According to a possible embodiment, if there is no other vehicle in front of the vehicle is captured by the camera, or the images of one or more other vehicles running in front of the vehicle captured by the camera become gradually smaller, the processing unit determines that the current traffic condition of the fast lane permits the vehicle to run in the allowed speed range of the fast lane.

According to a possible embodiment, if the sizes of the images of one or more vehicles running in front of the vehicle captured by the camera do not become gradually smaller, or the reduced magnitude is lower than a preset ratio in a preset time, the processing unit determines that the current traffic condition of the fast lane does not permit the vehicle to run in the allowed speed range of the fast lane.

According to a possible embodiment, the warning element sends out further warning signals with increased intensity and/or frequency if the driver of the vehicle does not take any action to improve the improper driving condition after the initial warning signal has been sent out.

According to a possible embodiment, the processing unit is connected with or integrated in the board computer of the vehicle.

The disclosure in another aspect provides a fast lane driving warning method which comprises the steps of: continuously capturing images in front of a vehicle which runs on a road that comprises a fast lane; analyzing the images to determine whether the vehicle is driving in the fast lane; and sending out a warning signal when the following conditions are both met: the vehicle runs in the fast lane at a vehicle speed lower than a lower limit of an allowed speed range of the fast lane over time longer than a preset time period; and the current traffic condition of the fast lane permits the vehicle to run in the allowed speed range of the fast lane.

BRIEF DESCRIPTION OF THE DRAWINGS

The foregoing and other aspects of the disclosure will be understood and appreciated more fully from the following detailed description taken in conjunction with the drawings, in which.

DETAILED DESCRIPTION

Some possible embodiments of the disclosure will be described with reference to the drawings.

Figure 1:
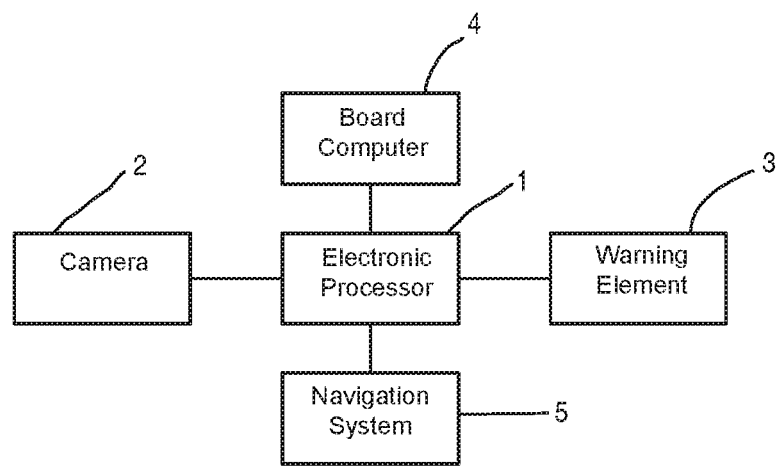
FIG. 1 is a block diagram of a fast lane driving warning unit according to an embodiment of the disclosure.

FIG. 1 shows schematically a fast lane driving warning unit according to an embodiment of the disclosure. The warning unit mainly comprises a processing unit 1, at least one camera 2 and a warning element 3.

The camera 2 may be mounted to a vehicle at a location where it can capture images in front of the vehicle. For example, the camera 2 is mounted to a front portion of the vehicle and is directed forwardly so that the camera 2 can scan an area of the road in front of the vehicle. The lateral scanning area of the camera 2 covers at least the right and left lane boundary lines that delimit the lane in which the vehicle runs. The camera 2 may be a camera in other existing system (such as driving assistant system, parking system, driving recording system) in the vehicle.

The processing unit 1 is connected with the camera 2 and continuously receives images captured by the camera 2 and judges whether the vehicle runs in a fast lane.

The processing unit 1 may be connected with or integrated in the board computer 4 of the vehicle to gather vehicle speed information.

The processing unit 1 is also connected with the warning element 3 and instructs the warning element 3 to send out a warning signal that indicates the vehicle has been driven in the fast lane at low speed for a long time.

Optionally, the processing unit 1 is connected with a navigation system 5 of the vehicle to get further useful information from it.

Here, the connection between the processing unit 1 and other elements may be either direct or indirect connection, may be connection by hardware or software, and allows to transmit signals via wire or in wireless manner.

It is noted that the processing unit 1 instructs the warning element 3 to send out a warning signal when the following conditions are both met: the vehicle runs in a fast lane at a low speed over a long time, and it is unreasonable for the vehicle running at such a low speed since the current traffic condition permits the vehicle to run in the allowed speed range.

Further, the term "long time" here means over a permitted time in the fast lane as regulated by traffic regulations. For example, in some regions, when a vehicle occupies a fast lane at a low speed for more than several minutes, it may be regarded as occupying the fast lane at a low speed over a long time and may be punished.

For this reason, the disclosure set a time period in the processing unit 1, and the vehicle will be regarded as occupying the fast lane at a low speed over a long time if it runs in the fast lane in a low speed for more than this time period. The preset time period may 1 to 5 minutes. In addition, the preset time period may be adjustable.

Figure 2:
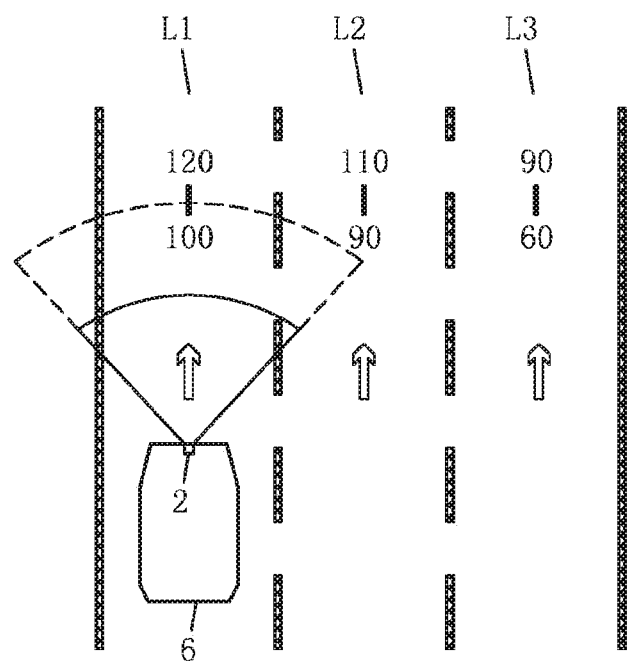
FIG. 2 is a schematic view showing the operation of the fast lane driving warning unit.

FIG. 2 shows schematically a road which comprises, as an example, three lanes L1, L2 and L3 with the same driving direction. For a right-hand traffic road, the left lane L1 is the fast lane or overtaking lane with the highest allowed speed range, for example, 100 to 120 km/hour, the middle lane L2 has an intermediate allowed speed range, for example, 90 to 110 km/hour, and the right lane L3 has the lowest allowed speed range, for example, 60 to 90 km/hour.

As shown, a vehicle 6 equipped with the warning unit of the disclosure runs in the fast lane L1. The camera 2 of the warning unit is shown as mounted to a middle part of the front portion of the vehicle 6 and scans a front area in front of the vehicle 6.

The fast lane L1 is defined by continuous lane boundary line at left side and a broken line at right side. The scanning area of the camera 2 covers portions of both the left lane boundary line in the form of a continuous line and the right lane boundary line in the form of a broken line, so the processing unit 1 can determine that the vehicle 6 is in the fast lane L1 based on the image from the camera 2. If it indicates in the image of the camera that the left side of the left lane boundary line is not a lane in the same direction, for example, left side of the left lane boundary line is a lane in opposite direction, a centre median divider or a road shoulder, it may additionally judge whether the vehicle 6 is in the fast lane L1. Information from the navigation system 5 may also be used for helping the processing unit 1 to determine the lane in which the vehicle 6 runs.

It is appreciated that, in countries with left-hand traffic, similar manners may be used for judging whether the vehicle 6 is in the fast lane L1.

The processing unit 1 can determine the allowed speed range information from the image from the camera 2. For example, the allowed speed range may be marked directly on the lane or on a traffic sign boards which are set along the road, like that marked in FIG. 2. In addition, information from the navigation system 5 may also be used for helping the processing unit 1 to determine the allowed speed range of the lane in which the vehicle 6 runs.

Further, the processing unit 1 also obtains the speed of the vehicle 6 from the board computer 4 and, in the condition that the speed of the vehicle 6 is lower than the lower limit of the allowed speed range, judges whether it is reasonable for the vehicle 6 runs in the fast lane L1 at speed that is lower than the lower limit of the allowed speed range for a long time. For example, if there is no vehicle in front of the vehicle 6 is captured by the camera 2, or the vehicles in front of the vehicle 6 run continuously faster than the vehicle 6 (which condition can be determined when the images of the vehicles in front of the vehicle 6 become smaller continuously or disappear), then the processing unit 1 determines that it is unreasonable for the vehicle 6 runs in the fast lane L1 at low speed for a long time. On the other hand, if the vehicles in front of the vehicle 6 run at nearly the same speed with the vehicle 6 (which condition can be determined when the sizes of the images of the vehicle in front of the vehicle 6 do not become smaller continuously, such as nearly unchanged or even become larger continuously overtime, for example, in a bad traffic condition), then the processing unit 1 determines that it is reasonable for the vehicle 6 runs in the fast lane L1 at low speed for a long time.

When the processing unit 1 determines that it is unreasonable for the vehicle 6 runs in the fast lane L1 at low speed for a long time, it sends an instruction to the warning element 3 so that the warning element 3 sends out a warning signal that indicates the vehicle has been driven in the fast lane at low speed for a long time. The warning signal may be flash signs or words on the screen of the dash board. An audio signal may be sent out additionally or alternatively.

The warning signal may notice the driver of this condition, and may also suggest the driver speeding up or changing to another lane.

The intensity and/or frequency of the warning signal may be increased if the driver does not take any action after the warning signal has been sent out.

Other types of information gathering and condition determining manners can also be used here as supplementary.

A fast lane driving warning method of the disclosure can be performed. The warning unit described above can be used in the warning method.

Figure 3:
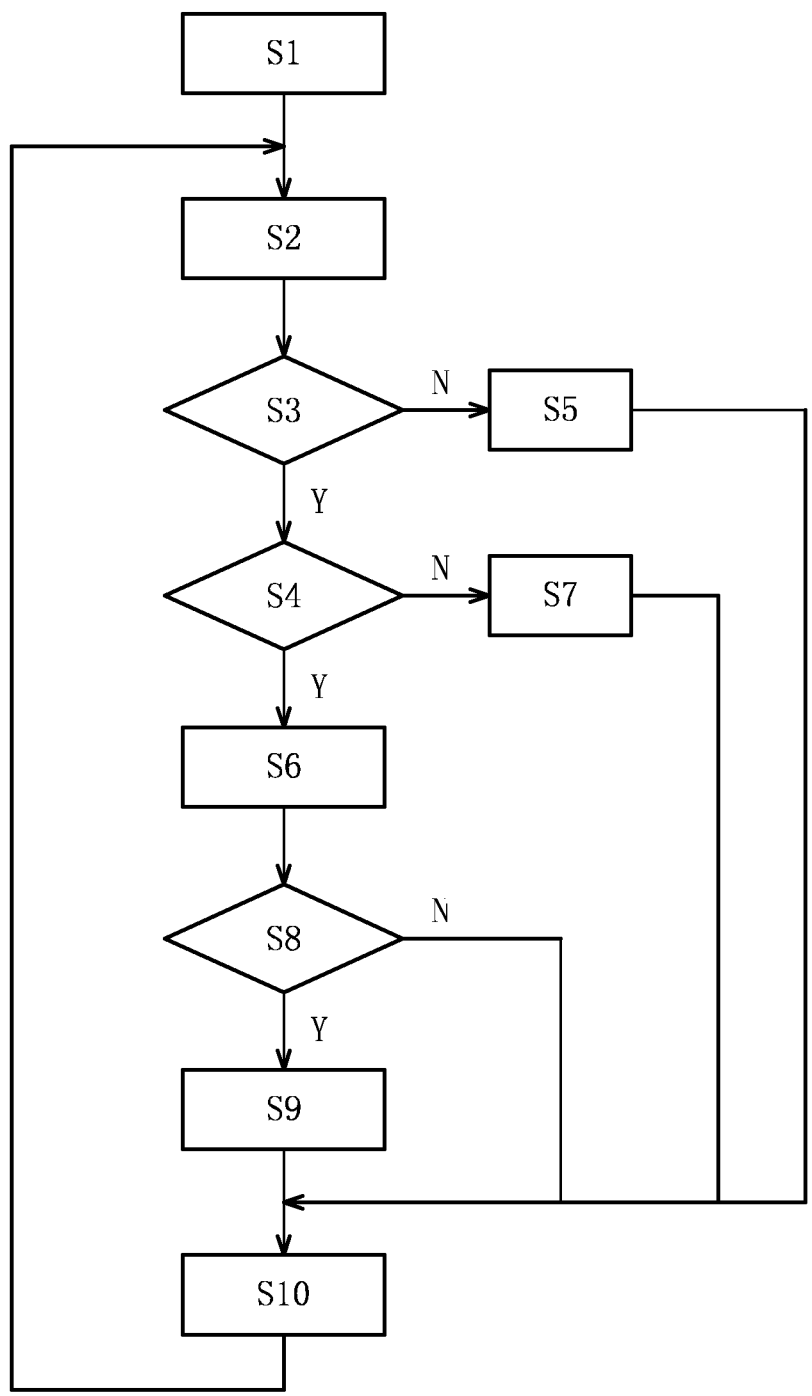
FIG. 3 is a flow chart showing a fast lane driving warning method according to an embodiment of the disclosure.

As an example, the fast lane driving warning method can be performed in a way shown in FIG. 3 in the following sequence.

In step S1, a fast lane driving warning procedure is started, and then the procedure goes to step S2.

In step S2, the lane in which the vehicle is driving is detected, and then the procedure goes to step S3.

In step S3, it judges whether the vehicle is in the fast driving lane. If the answer is Yes, then the procedure goes to step S4; if the answer is No, then the procedure goes to step S5.

In step S5, let a count be equal to zero, and then the procedure goes to step S10.

In step S4, it judges whether the speed of the vehicle is lower than the allowable minimum speed of the fast lane. If the answer is Yes, then the procedure goes to step S6; if the answer is No, then the procedure goes to step S7.

In step S7, let the count be equal to zero, and then the procedure goes to step S10.

In step S6, the count is added by 1, and then the procedure goes to step S8.

In step S8, it judges whether the value of the count is equal to or larger than a threshold. If the answer is Yes, then the procedure goes to step S9; if the answer is No, then the procedure goes to step S10.

In step S9, a warning signal is sent out to the driver, and then the procedure goes to step S10.

In step S10, the procedure pauses for a delay time, and then goes back to step S2.

Other procedures for effecting the same or similar functions can also be designed.

The delay time in step S10 may be a few seconds to tens of seconds.

Preferably, in step S9, the warning signal may be changed according to the value of the count. For example, as the value of the count becomes larger, the intensity of the warning signal in step S9 may become higher.

In the above procedure, the vehicle is judged as occupying the fast lane at a low speed over a preset time period by means of the combination of the value of the counter and the delay time, and the threshold in step S8 actually corresponds to this preset time period.

It is appreciated that the features described with reference to the warning unit are also applicable in the warning method.

According to the disclosure, a warning signal will be sent to the driver to indicate that the vehicle runs too slow in the fast lane for a long time, so that the driver may accelerate the vehicle or pull the vehicle into another lane. In this way, traffic regulation can be followed to avoid punishment from traffic administration departments, and driving safety can be improved to avoid traffic accidents.

Although the disclosure has been described above with reference to some preferred embodiments, the disclosure is not limited to the described details. Various modifications to the details can be made without departing from the spirit of the disclosure.

The invention claimed is:

1. A fast lane driving warning unit comprising:
an electronic processor (1),
a camera (2) connected to the electronic processor (1), and
a warning element (3) connected to the electronic processor (1);
wherein the camera (2) is configured to continuously capture images in front of a vehicle (6) which runs on a road that comprises a fast lane (L1);
wherein the electronic processor (1) is configured to receive images captured by the camera (2) and analyzes the images to determine whether the vehicle (6) is driving in the fast lane (L1); and
wherein the electronic processor (1) is further configured to instruct the warning element (3) to send out a warning signal when the following conditions are both met:
the vehicle (6) runs in the fast lane (L1) at a vehicle speed lower than a lower limit of an allowed speed range of the fast lane (L1) over time longer than a preset time period; and
the current traffic condition of the fast lane (L1) in front of the vehicle (6) permits the vehicle (6) to run in the allowed speed range of the fast lane (L1).

2. The fast lane driving warning unit of claim 1, wherein the electronic processor (1) is configured to determine the lane in which the vehicle (6) is driving based on the right and left lane boundary lines delimiting the lane.

3. The fast lane driving warning unit of claim 1, wherein the preset time period is 1 to 5 minutes, and the preset time period is adjustable.

4. The fast lane driving warning unit of claim 3, wherein the electronic processor (1) is configured to obtain the allowed speed range of the fast lane (L1) from (a) images of traffic signs of the road captured by the camera (2), (b) from a navigation system of the vehicle, or both (a) and (b).

5. The fast lane driving warning unit of claim 1, wherein the electronic processor (1) is configured to determine whether the current traffic condition of the fast lane (L1) permits the vehicle (6) to run in the allowed speed range of the fast lane (L1) based on the images in the front of the vehicle (6) captured by the camera (2).

6. The fast lane driving warning unit of claim 5, wherein, when there is no other vehicle in front of the vehicle (6) captured by the camera (2), or the images of one or more other vehicles running in front of the vehicle (6) captured by the camera (2) become gradually smaller, the electronic processor (1) determines that the current traffic condition of the fast lane (L1) permits the vehicle (6) to run in the allowed speed range of the fast lane (L1).

7. The fast lane driving warning unit of claim 5, wherein, if the sizes of the images of one or more vehicles running in front of the vehicle (6) captured by the camera (2) do not become gradually smaller, or the reduced magnitude is lower than a preset ratio in a preset time, the electronic processor (1) determines that the current traffic condition of the fast lane (L1) does not permit the vehicle (6) to run in the allowed speed range of the fast lane (L1).

8. The fast lane driving warning unit of claim 1, wherein the warning element (3) of the electronic processor (1) sends out further warning signals with (a) increased intensity, (b) increased frequency, or both (a) and (b) when the driver of the vehicle does not take any action to improve the improper driving condition after the initial warning signal has been sent out.

9. The fast lane driving warning unit of claim 1, wherein the electronic processor (1) is connected with or integrated in the board computer (4) of the vehicle.

10. A fast lane driving warning method comprising the steps of:
continuously capturing, via a camera (2), images in front of a vehicle (6) which runs on a road that comprises a fast lane (L1);
analyzing, via an electronic processor (1), the images to determine whether the vehicle (6) is driving in the fast lane (L1); and
sending out, via a warning element (3) connected the electronic processor (1), a warning signal when the following conditions are both met:
the vehicle (6) runs in the fast lane (L1) at a vehicle speed lower than a lower limit of an allowed speed range of the fast lane (L1) over time longer than a preset time period; and
the current traffic condition of the fast lane (L1) in front of the vehicle (6) permits the vehicle (6) to run in the allowed speed range of the fast lane (L1).

11. The method of claim 10, wherein the current traffic condition of the fast lane (L1) permitting the vehicle (6) to run in the allowed speed range of the fast lane (L1) is determined by no other vehicle in front of the vehicle being captured by the camera, or the sizes of the images of other vehicles in front of the vehicle become smaller continuously to indicate the other vehicles run continuously faster.

12. The method of claim 10 wherein, if the sizes of the images of one or more vehicles running in front of the vehicle (6) captured by the camera (2) do not become gradually smaller, or the reduced magnitude is lower than a preset ratio in a preset time, the electronic processor (1) determines that the current traffic condition of the fast lane (L1) does not permit the vehicle (6) to run in the allowed speed range of the fast lane (L1).

13. The method of claim 10, wherein the warning signal suggests the driver speed up or change to another lane.

14. The method of claim 13, wherein the warning element (3) of the electronic processor (1) sends out further warning signals with (a) increased intensity, (b) increased frequency, or both (a) and (b) when the driver of the vehicle does not take any action to improve the improper driving condition after the initial warning signal has been sent out.

15. The method of claim 10, wherein the electronic processor (1) obtains vehicle speed information from a computer (4) for the condition of the vehicle (6) running in the fast lane at a vehicle speed lower than the lower limit of the allowed speed range.

16. The fast lane driving warning unit of claim 1, wherein the electronic processor (1) obtains vehicle speed information from a board computer (4) for the condition of the vehicle (6) running in the fast lane at a vehicle speed lower than the lower limit of the allowed speed range.

* * * * *